United States Patent Office 3,347,344
Patented Oct. 17, 1967

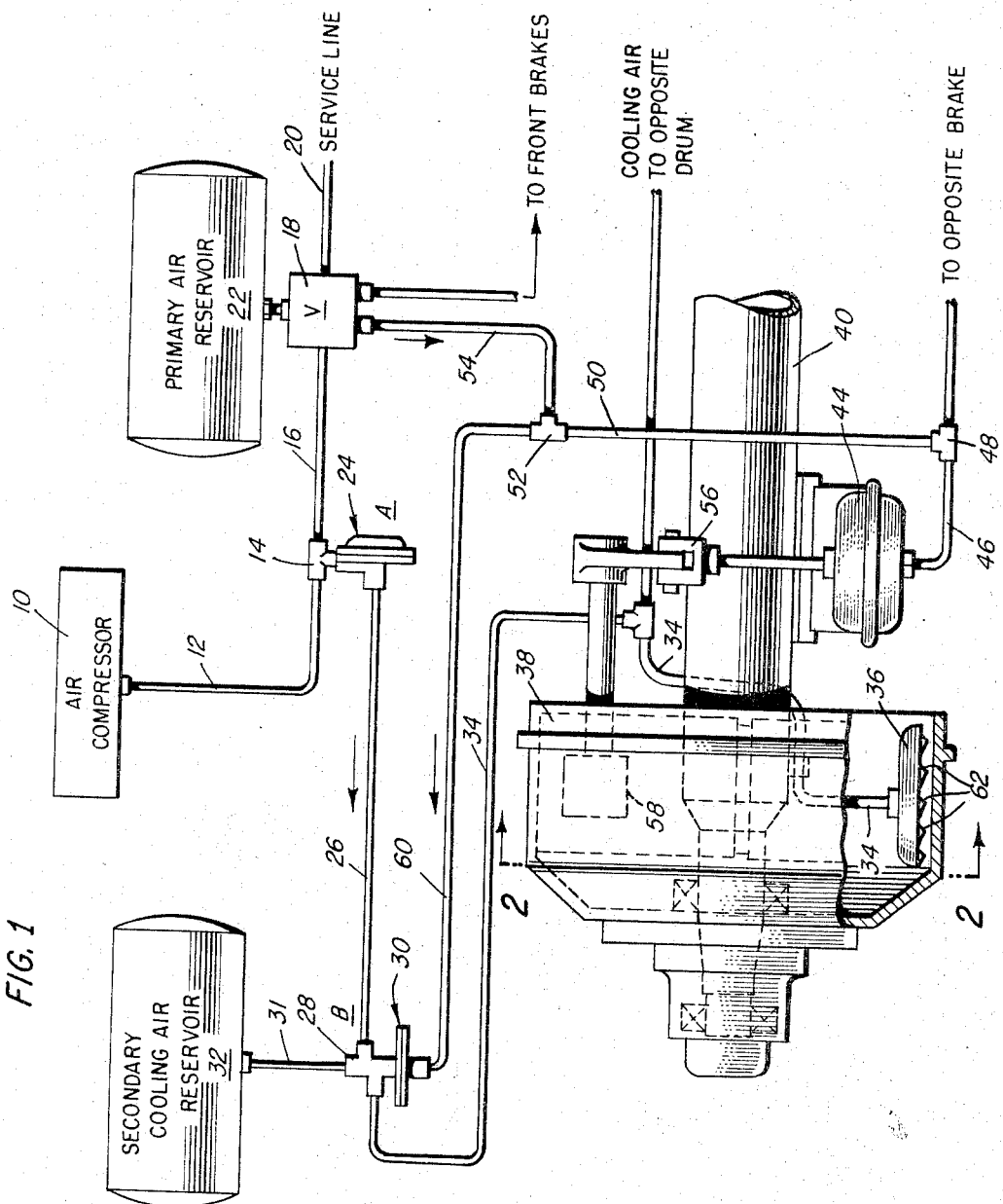

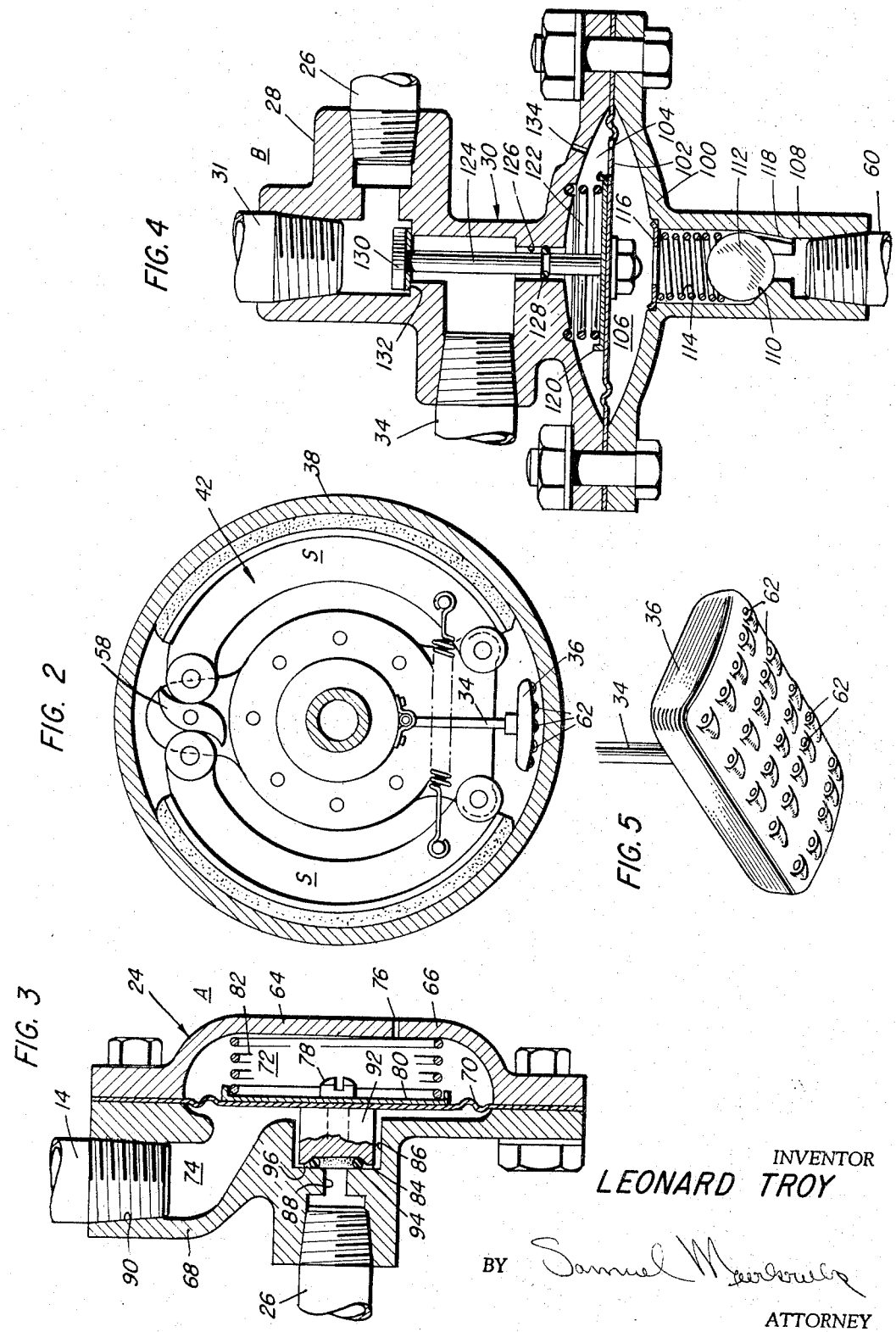

3,347,344
BRAKE COOLING SYSTEM
Leonard Troy, 611 N. Webster Ave.,
Scranton, Pa. 18510
Filed Sept. 29, 1965, Ser. No. 491,252
9 Claims. (Cl. 188—264)

ABSTRACT OF THE DISCLOSURE

A system for cooling a brake rotor actuated by an actuator controlled by pressure from a primary air reservoir; including an air compressor connected to the primary air reservoir through a preference valve functioning to direct air pressure to a secondary cooling air reservoir controlled by a relay valve effective to direct a blast of air to the braking surface of the rotor simultaneously as the brakes are actuated, and effective to continue a flow of cooling air to the rotor after the brakes are no longer applied.

---

This invention relates to fluid pressure apparatus and more particularly to a fluid pressure braking system adapted for use in connection with automotive vehicles.

Power operated braking systems have used in the past, as an energy source, compressed air accumulated in storage tanks or reservoirs. Compressors are utilized to build up a predetermined pressure available for braking, for example, 100 pounds per square inch.

During a brake application and particularly during a "panic stop," for example, a phenomenon called "brake fade" sometimes occurs. Without discussing all factors causing "brake fade," one factor materially impairing effective braking efficiency is the build up of heat in the brake drums and shoes. Further, accumulation of foreign matter in the braking assemblies causes excessive part wear and loss of efficiency. Still further, excessively heated drums cause "checking" or flaking of the braking surface causing excessive lining wear and inefficiency.

A primary object of the present invention is to provide a brake system including means for cooling the braking components.

Another object of the present invention is to provide a braking system utilizing a supplementary air reservoir functioning to both cool brake shoes and drums during and after a brake application, and blow foreign matter out of the brake assembly.

A still further object of the present invention is to provide in a braking system a compressed air reservoir functioning to store cooling and cleaning air after a predetermined supply of braking compressed air has accumulated.

These together with other and more specific objects and advantages of the invention will become apparent from the following description of an exemplary embodiment when taken in conjunction with the accompanying drawings forming a part thereof, in which:

FIGURE 1 is a diagrammatic view showing the novel system of the invention;

FIGURE 2 is a vertical section taken substantially on the plane of line 2—2 of FIGURE 1;

FIGURE 3 is an enlarged sectional view of a preference or pressure protection valve assembly to direct air to a cooling or supplementary air supply reservoir;

FIGURE 4 is an enlarged sectional view of a relay valve utilized to direct cooling air to a brake drum during a brake application; and FIGURE 5 is a perspective view of an air discharge nozzle utilized to sweep the interior of a rotary drum during and shortly after a brake application.

Referring to the drawing in detail, and first considering FIGURE 1, a typical trailer-tractor installation is illustrated diagrammatically; however, the basic system could be utilized in braking systems for other vehicles, such as passenger vehicles, busses, aircraft, etc.

An air compressor 10 is connected by a conduit 12 to a T-connector 14 which is connected by a conduit 16 to a control valve 18 of any suitable character, see, for example, the patent to Casler et al., 2,062,500. The control valve includes a service line 20 adapted to provide control pressure or signals to a truck-tractor or the like. The control valve 18, as is conventional, is connected to a primary, fluid-pressure reservoir 22 which will store pressure generated by the compressor 10, as is conventional.

The T-connection 14 is connected to a preference or pressure-protection valve 24 which functions to permit a predetermined pressure to initially build up and be maintained in the primary reservoir 22. The valve 24 is connected by a conduit 26 to a connection 28 of a relay valve 30 connected by conduit 31 to an auxiliary reservoir 32. The relay valve 30 functions, in response to a brake application, to cause air pressure from the auxiliary cooling air reservoir 32 to be directed through a conduit 34 to a nozzle or outlet means 36 located within a brake drum or rotor 38 suitably journaled on an axle 40.

The brake drum has mounted therein a suitable brake shoe assembly 42; see FIGURE 2, which is activated in any suitable manner. The brake actuator is shown by way of example only, as the cam-actuated type. However, any suitable actuator can be utilized. The axle has mounted thereon an actuator or operator 44 which is connected by a conduit 46 through connection 48, line 50, connection 52 and line 54 to the relay valve 18.

The operator 44 is connected to an operating linkage 56 to brake shoe operating cam 58 of the brake assembly. The connection 52 is connected to a branch of control line 60 connected to a control chamber of the relay valve 30.

Prior to describing the valves 24 and 30, the system functions as follows:

Operation of the compressor causes pressure to accumulate in the primary air reservoir 22. Until a predetermined pressure builds up in tank 22, no pressure is directed to reservoir 32. Assuming that the braking system requires 100 lbs. per sq. inch, after this pressure builds up in tank 22, the compressor 10 continues to operate and the valve 24 directs air to the auxiliary cooling air reservoir 32. The compressor continues to operate until a predetermined pressure builds up in reservoir 32, i.e., 110 pounds per sq. inch, for example.

Assuming a brake application must be made and/or intermittent brake applications are made when descending a downgrade, for example, operation of the control valve 18 will cause control pressure to be directed through lines 54, 50 and 46 to activate operator 44 and cause brake shoes S to engage the brake drum or rotor 38. Simultaneously, control pressure is directed through line 60 to the valve 30. This causes air from reservoir 32 to be directed through line 34 to nozzle 36 which causes pressurized air to sweep the inner surface of drum 38 as it rotates.

The nozzle 36 includes outlet ports 62; see FIGURES 1 and 5, which may be directed angularly and outwardly with respect to the inner surface of the drum to sweep foreign matter out of the brake drum.

The valve 30 may include means functioning to cause cooling air to continue to be directed out of drum 38 after the brakes are no longer being applied. The delayed action or modulation of the relay valve 30, and continued blast of cooling air, preventing surface checking of the brake drum braking surface, provides cooler operating brakes and affords greater braking efficiency through cooler operating brakes.

Referring to FIGURE 3, the preference or pressure-protection valve 24 includes a body portion 64 including mating halves 66 and 68 having a diaphragm 70 sealingly engaged therebetween. The diaphragm 70 defines opposed, variable-volume chambers 72 and 74, and the chamber 72 is vented to the atmosphere at 76. The diaphragm 70 has connected, by a screw 78, a base plate 80 which is engaged by a compression spring 82 normally urging the plate 80 toward the left as seen in FIGURE 3. The body half 68 includes a valve seat 84 formed in a recess or bore 86 and an outlet port 88 connected to the conduit 26. The T-connection 14 is connected to a bore 90 communicating with the chamber 74. A valve element 92 is fixed to the diaphragm 70 opposite the plate 80 and extends into the bore 86. The valve element 92 includes a resilient sealing ring 94 engageable on the seat 84 and surrounding the bore 88 for normally preventing communication between chamber 74 and outlet port 88.

The valve element 92 includes an annular rib or finger 96 surrounding the sealing ring 94 and engageable on seat 84 after a predetermined amount of compression of the ring 94 has occurred. The fingers 96 will prevent excessive compression of ring 94 and increase the useful life of the ring 94.

Referring to FIGURES 1 and 3, the compressor initially functions to direct pressurized air through the T-connector 14, control valve 18 and primary air reservoir 22. The spring 82 is rated to hold the valve element 92 on the seat 84 until a predetermined pressure has built up in reservoir 22 and chamber 74 of the valve 24. After the reservoir 22 is charged, sufficient pressure builds in chamber 74 to react against the diaphragm 80 to cause line 12 to communicate with line 26.

The relay valve 30 includes a body formed by a pair of suitably conformed halves 98 and 100 having sealingly interposed therebetween a diaphragm 102 forming opposed, variable-volume chambers 104 and 106. The half 100 includes a stem portion 108 connected to the conduit 60 connected to the control pressure line. The stem portion 108 includes a valve seat 110 engageable by a ball-type valve element 112 which is spring urged toward the seat 110 by a relatively "soft" spring 114 abuttingly engaged by a lock washer 116. The chamber 106 may include a bleed orifice 118 which will permit air to bleed from chamber 106 after the brakes are no longer applied, or this bleeding may be obtained by imperfect seating of valve 110. The valve 110 obviously may be other than the ball-type shown.

The diaphragm includes a rigid backing plate 120 engaged by a compression spring 122 interposed in chamber 104. A valve stem 124 is fixedly connected to the diaphragm 102 and plate 120 extends through a passage 126 and has an intermediate seal 128 circumposed thereabout. The stem 124 includes a terminal valve portion 130 engageable on a seat 132 interposed between conduits 26 and 34. There is direct communication between the conduits 26 and 31 for charging the secondary or auxiliary cooling air reservoir 32. It will be noted that chamber 104 is vented to atmosphere through port 134.

The valve element 130 is normally urged onto seat 132 by spring 122 and prevents conduit 31 from communicating with port 34, i.e., air will not flow to nozzle 36. During a brake application, the operator 44 is activated through lines 54, 50 and 46, and at the same time, air pressure is directed to line 60. The ball valve 112 is raised off seat 110 and pressure reacts on diaphragm 102 to raise the valve element 130 off seat 132. The chamber 104 is vented at 134 to permit air trapped therein to be relieved. When the valve element leaves seat 132, the reservoir 32 is connected to line 34 and the air escaping from outlets 62 of nozzle 36 cools the drum 38 and sweeps foreign matter therefrom. When control air is no longer directed to line 60, i.e., brakes are released, the ball valve 112 reseats and air is trapped in chamber 106. The air trapped in chamber 106 continues to react on diaphragm 102 and causes valve element to remain unseated, i.e., air continues to flow from reservoir 32 to nozzle 36. The orifice or bleed port 118 eventually relieves pressure trapped in chamber 106 and thus there is a time delay of the reseating of valve 130 on seat 132.

Other means can be provided to cause slow bleeding of air from chamber 106, for example, the ball valve 112 and a valve seat 110 may incorporate a partial bypass whereby air is very slowly bled from chamber 106.

There has been disclosed a novel system and particular components which facilitate the functioning thereof to provide cooler operating and clean brakes which promote the efficiency of a braking system.

Although the novel system has been disclosed in detail with respect to a pneumatically operated system, it will be clearly apparent to those skilled in the art that pneumatically and vacuum-operated systems may incorporate the novel brake-rotor cooling system and thus the exemplary embodiment is disclosed by way of example and not by way of limitation.

It will be obvious to those skilled in the art that various changes may be made without departing from the spirit of the invention and therefore the invention is not limited to what is shown in the drawings and described in the specification but only as indicated in the appended claims.

What is claimed is:

1. In a brake system comprising a brake assembly including a rotor, friction applying means operatively associated with said rotor, control means operatively connected to said friction applying means for engaging said friction applying means with said rotor; the improvement comprising a rotor cooling system including auxiliary cooling-air reservoir means, air compressor means, preference valve means operatively connected between said auxiliary cooling-air reservoir means and said compressor means for permitting a predetermined pressure to first accumulate in said reservoir, relay valve means connected to said auxiliary cooling-air reservoir means, and an outlet nozzle disposed in said rotor and operatively connected to said relay valve means, said control means including a pressure control line operatively connected to said relay valve means for causing said auxiliary reservoir means to communicate with said nozzle means during a brake application for sweeping air across that portion of the rotor engaged by said friction applying means simultaneously as the brakes are applied.

2. In the system as claimed in claim 1 in which said relay valve includes time delay means for affording communication between said auxiliary reservoir means and said nozzle means after said brake assembly is de-activated.

3. In the system as claimed in claim 1 including a primary air reservoir, said compressor means being connected to said primary air reservoir means through said preference valve means.

4. In the system as claimed in claim 3 in which said preference valve means includes a connector connecting said primary reservoir means to said compressor means, a valve seat interposed between said auxiliary reservoir means and said primary air reservoir means, a pressure responsive valve element normally biased into seated relationship toward said valve seat and subject to pressure built up in said compressor means.

5. The system as claimed in claim 4 in which said valve element includes a resilient seal element, and means on said valve element and engageable with said seat for preventing excessive deformation of said seal element.

6. The system as claimed in claim 4 in which said relay valve includes a control chamber operatively connected to said control means, a pressure-responsive member forming one side of said control chamber, a valve element mounted on said pressure responsive member, a valve seat interposed between said auxiliary reservoir means and said nozzle means and engageable by said valve element.

7. The system as claimed in claim 6 in which said control chamber includes a check valve assembly interposed between said control means and said control chamber, and control chamber bleed means in said control chamber for permitting said control chamber to be relieved after a brake application.

8. In a vehicle brake structure, a stationary support and a rotatable brake member, at least one actuable shoe with a friction material attached thereon wherein the actuation of said shoe causes frictional engagement of said material against said brake member thus retarding movement of said vehicle; a vehicle air system for applying said shoe, an auxiliary cooling air storage tank for storing air for cooling said brake member, a lower priority preference valve communicating with said auxiliary tank and vehicle air system for preventing admission of air to said auxiliary cooling air storage tank from said vehicle air system until ample air is first accumulated for brake application, a relay valve communicating with said auxiliary cooling air storage tank, and fixed jets aimed at the braking surface of the brake member at a position essentially away from where it is engaged by the friction material; said relay valve also communicating with a portion of the vehicle air system which encounters a change of pressure when the brakes are applied and so arranged so that a normal brake application will cause said relay valve to open thus causing air to be blown against the swept surface of said brake member as the brakes are applied.

9. In the system as claimed in claim 8 in which said relay valve includes means so arranged that a noticeable lapse of time occurs after the brake application is discontinued and the relay valve is closed causing continued cooling for a period of time after brake application is over.

References Cited

UNITED STATES PATENTS

| | | | |
|---|---|---|---|
| 714,497 | 11/1902 | Mailloux et al. | 188—264 X |
| 1,025,340 | 5/1912 | Turner | 303—5 |
| 2,091,865 | 8/1937 | Leveen | 188—264 X |
| 2,851,132 | 9/1958 | James | 188—264 |
| 2,959,255 | 11/1960 | White | 188—264 |

MILTON BUCHLER, *Primary Examiner.*

G. E. HALVOSA, *Assistant Examiner.*